United States Patent [19]
Ek

[11] Patent Number: 4,831,923
[45] Date of Patent: May 23, 1989

[54] CORED FOOD FILLING APPARATUS

[75] Inventor: Kurt L. Ek, S-Vaesteraes, Sweden

[73] Assignee: Nestec S.A., Vevey, Switzerland

[21] Appl. No.: 95,324

[22] Filed: Sep. 10, 1987

[30] Foreign Application Priority Data

Oct. 1, 1986 [EP] European Pat. Off. ......... 86113532.5

[51] Int. Cl.$^4$ ............................................. A23N 15/00
[52] U.S. Cl. ........................................ 99/494; 426/282
[58] Field of Search .................... 426/282; 99/494, 420

[56] References Cited

U.S. PATENT DOCUMENTS

| | | | |
|---|---|---|---|
| 390,170 | 9/1888 | Humaston | 99/494 |
| 667,423 | 2/1901 | Brown | 99/494 |
| 1,258,245 | 3/1918 | Riegel | 99/420 |
| 1,502,929 | 7/1924 | Tuttle | 99/494 |
| 1,854,850 | 4/1932 | Linkenauger | 99/420 |
| 2,858,862 | 11/1958 | Francisco | 99/494 |
| 4,162,333 | 7/1979 | Nelson et al. | 99/494 |
| 4,643,905 | 2/1987 | Getman | 99/494 |

FOREIGN PATENT DOCUMENTS 234781 1/1969 U.S.S.R. ................................ 99/494

OTHER PUBLICATIONS

Translation of Soviet Patent No. 234781; N.Ya. Rabiner, et al.; "Equipment for Preparing and Stuffing Peppers", Patented Jan. 10, 1969.

Primary Examiner—Wilbur Bascomb
Attorney, Agent, or Firm—Vogt & O'Donnell

[57] ABSTRACT

An apparatus is provided for filling cored frozen fruit and vegetable foods with filling materials. The cored foods are transported by a conveyor device to a filling device for filling. The conveyor includes conveying means having apertures therethrough which are defined by circumferential aperture walls for supporting a lower circumferential surface of the foods and from which spikes protrude which terminate in sharp points for penetrating the surface of the foods for holding the foods in a substantially fixed and steady position within the apertures. The conveyor may include a plurality of plates which contain a plurality of apertures and associated aperture walls and spikes for enabling the filling a plurality of the cored foods at the same time.

7 Claims, 2 Drawing Sheets

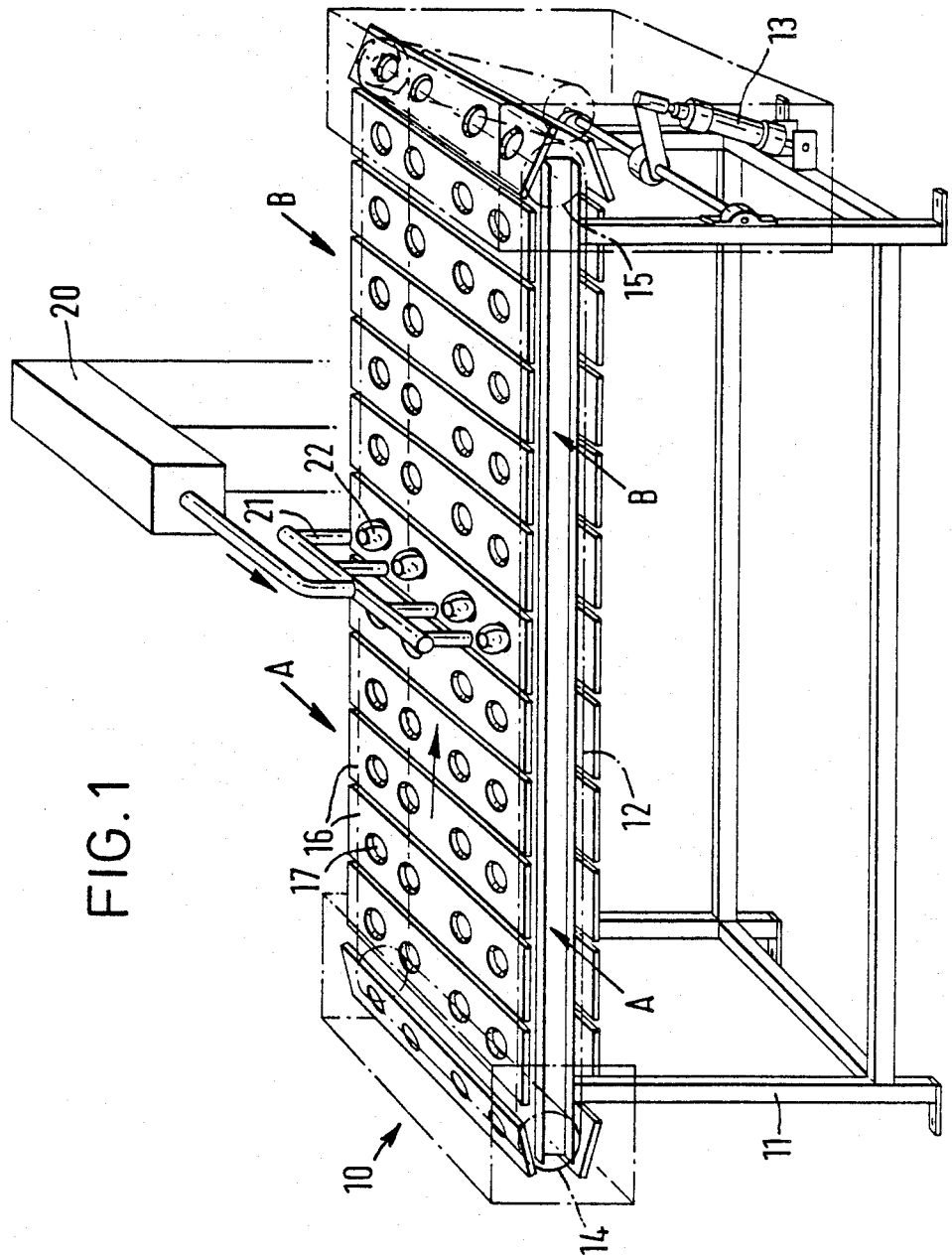

CORED FOOD FILLING APPARATUS

BACKGROUND OF THE INVENTION

The present invention relates to an apparatus and process for filling frozen cored fruits or vegetables.

There are difficulties in filling certain cored fruits or vegetables, such as peppers, where the diameter of the opening at the top is narrower than the main body below. Nowadays, peppers are filled by hand because there is no satisfactory equipment available. This is time-consuming and expensive. However, in order to fill frozen cored peppers automatically on a conveyor belt, it is essential that they should be reliably fixed and held steady at the filling position. Side supports are unsuitable not only because of the different shapes and sizes of the frozen peppers but also because of their slippery surfaces which causes the peppers to wobble and move out of the ideal filling position.

SUMMARY OF THE INVENTION

We have found that if frozen, cored fruits or vegetable are supported on three sharp points, the above problems can be overcome and the process is very much more efficient than when filling by hand.

Accordingly, the present invention provides an apparatus for filling a cored frozen fruit or vegetable comprising a conveyor adapted to run intermittently in a predetermined downstream direction above which is a filler, means for advancing the conveyor to transport the fruit or vegetable with its open end facing upwards to a position below the filler, means for stopping the conveyor at this position for a period of time sufficient for filling and means for restarting the conveyor to transport the filled fruit or vegetable away from the filler, characterized in that the conveyor is provided with a supporting means for the lower surface of the fruit or vegetable having at least three sharp points capable of making an incision in the lower surface and positioned to hold the fruit or vegetable in a substantially fixed and steady position during the filling.

The present invention also provides a process for filling a cored frozen fruit or vegetable wherein the fruit or vegetable is positioned with its open end facing upwards on a horizontal conveyor and transported in a downstream direction to a position beneath a filler where the conveyor stops to enable filling to take place after which the conveyor restarts to transport the filled fruit or vegetable away from the filler, characterized in that the fruit or vegetable is supported on the conveyor in a substantially fixed and steady position by at least three sharp points capable of making an incision in the lower surface of the fruit or vegetable.

DESCRIPTION OF PREFERRED EMBODIMENTS

The apparatus and process of this invention is applicable to any frozen fruit or vegetable which may be cored and filled, for example, peppers, tomatoes, onions, apples, pears, mushrooms, olives, artichokes bottoms, celery bottoms, oranges, lemons, peaches, potatoes, squash, turnips, aubergines, etc.

Conveniently, the sharp points may be the protruding sharp points of spikes which are embedded in the conveyor. The length of the spikes may conveniently be up to 2 cms, preferably from 0.25 cm to 1.75 cm and especially from 0.5 cm to 1.5 cm. The diameter of the spikes may be from 0.5 to 1.5 mm and preferably from 0.75 to 1.25 mm. The spikes are preferably metallic and may be, for instance, nails.

In a particularly preferred embodiment, the conveyor is in the form of plates provided with apertures transported on a chain. The plates may be made of plastics material, for example, a polythene plastics material sold under the Trade Mark SOLIDUR RCH 1000 generally available in Sweden. The spikes are embedded in the plates around the apertures. The presence of the apertures enables fruits and vegetables of different sizes and shapes to be handled.

We have found, surprisingly, that the fruit or vegetable can be supported in a substantially fixed and steady position without the sharp points piercing through the wall or penetrating so deeply into the wall of the fruit or vegetable that an unsightly or undesirable scar or mark would be left after the fruit or vegetable is removed.

In order to ensure that the fruit or vegetable is supported in a fixed and steady position, when three points are used, they are conveniently positioned substantially equidistantly from each other, that is, substantially at the angles of an imaginary substantially equilateral triangle connecting them. In this way, the fruit or vegetable is contacted by the three points substantially symmetrically around its lower surface.

In positioning the frozen cored fruit or vegetable on the points, it is important that the wall of the cored fruit or vegetable is not pierced through. Although the extent of penetration depends on such factors as the structure of the fruit or vegetable and the thickness and temperature of the wall, the points should not penetrate the wall of the fruit or vegetable usually by more than about 1 cm, preferably from 0.25 to 0.75 cm, in order to obtain a steady, reliable support in a predictable position so that the fruit or vegetable does not wobble. In this way, when the fruit or vegetable is removed from the points, substantially no traces of the incisions are visible.

The filler is positioned above the conveyor and may be any conventional device, such as a hopper, for holding the filling material. It is advantageously provided with a nozzle which can be placed in the opening at the upper end of the frozen cored fruit or vegetable to enable accurate dosing without any spillage. The nozzle is preferably positioned automatically in the opening of the fruit or vegetable and may, for instance, be driven by a pneumatic cylinder and controlled by an electric sensor.

The materials used for filling the fruit or vegetables may be any materials conventionally used for such purposes. For example, vegetables may be filled with meat stew, vegetable stew, mashed vegetables, mashed potatoes or sauces, while fruits may be filled with fruit jellies, mashed fruit, purees, cream or fruit stews.

After filling, the conveyor restarts and the filled fruit or vegetable may removed from the belt, for instance, by an automatic transfer device or by hand.

The invention is described and illustrated further by way of example with reference to the following drawings.

BRIEF DESCRIPTION OF THE DRAWINGS

FIG. 1 is a diagrammatic side view of an apparatus of the present invention.

DETAILED DESCRIPTION OF THE DRAWINGS

Figure 3:
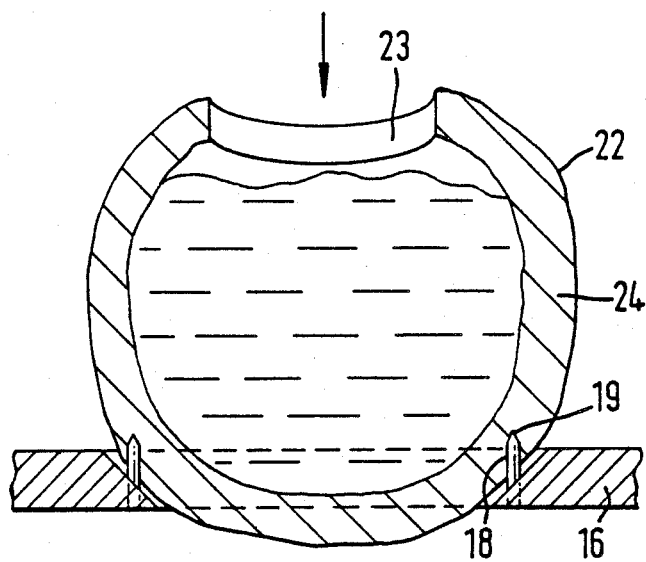
FIG. 3 is a sectional side view of a plate in the region of an aperture.
Figure 2:
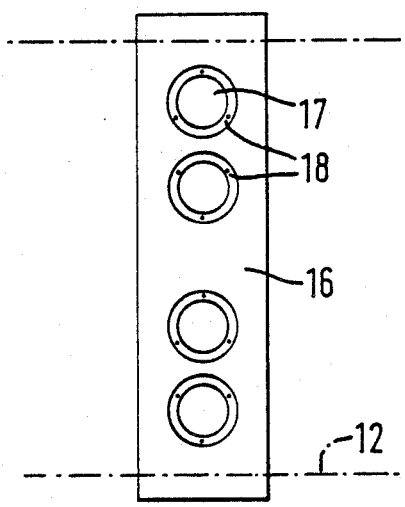
FIG. 2 is a top plan view of a plate.

The apparatus, generally designated 10, is supported on a frame 11 and comprises a chain 12 adapted to move intermittently by means of a cylinder 13, trained around rollers 14,15 which transports polythene plates 16 provided with apertures 17 around the circumference of which are embedded nails 18 with sharp points 19, the nails having a diameter of 1 mm and a length of 100 mm. A filler 20 is provided with nozzles 21 driven by a pneumatic cylinder and controlled by an electrical sensor (not shown). Cored peppers 22 with their openings 23 facing upwards are shown beneath the nozzles 21 in FIG. 1 while in FIG. 3 a cored pepper 22 with its opening 23 is shown with two nails 18 penetrating the wall 24 to a depth of 50 mm.

In operation, four cored green peppers are fixed securely by hand on the nails 18, one pepper on each the apertures 17 of a plate 16, at the position indicated by the arrows A—A in FIG. 1 upstream of the filler 20 while the chain 12 is stationary. The chain 12 then moves to the right in FIG. 1 until a row of cored peppers on a plate 16 is positioned beneath the filler 20 containing four nozzles 21 at which point the chain stops. The filler contains meat stew and the nozzles automatically position themselves, by means of the electrical sensor and pneumatic cylinder, in the openings of the peppers and dose the peppers with a predetermined quantity of meat stew. While the chain is stationary during dosing, another row of cored green peppers is fixed at the position indicated by the arrows A—A in FIG. 1. After dosing, the chain restarts to carry the filled peppers away from the filler to the position indicated by the arrows B—B where it stops once more and the filled peppers are removed automatically and carried away. While the chain is stationary at this position, the next row of cored peppers is being filled and at the same time a further row of cored peppers is fixed at the position indicated by A—A in FIG. 1. This procedure, with intermittent movement of the chain, is continued and the only personnel required are two people to place the cored peppers on the nails in order to obtain an output of 500 kg/hr. In contrast, when the complete process is carried out by hand, 10 people are required to obtain the same output.

I claim:

1. In an apparatus for filling cored frozen fruit and vegetable foods with filling materials having a conveyor device for advancing and positioning the foods for filling of the cores with the filling materials via an opening in an upper surface of the goods by a filling device, the improvement comprising the conveyor device having conveying means having apertures therethrough which are defined by circumferential aperture walls for supporting a lower circumferential surface of the foods and from which at least three spikes protrude which terminate in sharp points for penetrating the surface of the foods for holding the foods in a substantially fixed and steady position within the apertures for positioning by the conveyor for filling by the filling device.

2. An apparatus according to claim 1 wherein the spikes are positioned substantially equidistant about the aperture walls.

3. An apparatus according to claim 1 wherein the spikes extend for a length of up to 2 cm from the aperture walls.

4. An apparatus according to claim 3 wherein the spikes extend for a length of from 0.25 cm to 1.75 cm from the aperture walls.

5. An apparatus according to claim 1 wherein the spikes have a diameter of from 0.75 mm to 1.25 mm.

6. An apparatus according to claim 1 wherein the conveying means having apertures comprises a plurality of plates which form the conveying means.

7. An apparatus according to claim 6 wherein each of the plates have a plurality of apertures and associated aperture walls and spikes.

* * * * *

UNITED STATES PATENT AND TRADEMARK OFFICE
CERTIFICATE OF CORRECTION

PATENT NO. : 4,831,923
DATED : May 23, 1989
INVENTOR(S) : Kurt L. EK

It is certified that error appears in the above-identified patent and that said Letters Patent is hereby corrected as shown below:

Column 4, line 12 [line 5 of claim 1], "goods" should read -- foods --.

Signed and Sealed this

Third Day of April, 1990

Attest:

HARRY F. MANBECK, JR.

*Attesting Officer*　　　　　　　*Commissioner of Patents and Trademarks*